Nov. 3, 1942.  A. C. FINDLAY  2,301,033
CALCULATING DEVICE
Filed Aug. 25, 1939

Inventor:
Alexander C. Findlay
By Ames, Thiess, Olson & Mecklenburger
Attys.

Patented Nov. 3, 1942

2,301,033

UNITED STATES PATENT OFFICE 2,301,033

CALCULATING DEVICE

Alexander C. Findlay, Flint, Mich.

Application August 25, 1939, Serial No. 291,819

2 Claims. (Cl. 235—84)

This invention relates to calculating devices and more particularly to devices of this type permitting certain mathematical calculations to be simply and quickly made.

Broadly, the invention is directed to a new and improved structure of this type which, in combination with certain scales provided thereon, will permit mathematical computations which could not be produced heretofore by devices of this kind, which mathematical computations are important to obtain in a quick and accurate manner, and which lend considerable utility to the structure as a calculating device.

As an object of the invention, a plurality of circular logarithmic scales are provided upon a series of concentric circular members and are adapted to be brought into certain given relations to effect a number of exceptionally valuable calculations in a very rapid and accurate manner. The invention resides particularly in the structure and in the logarithmic scales providing these relations between the scales whereby readings are obtainable that are the result of calculations brought about by the manner in which the scales are associated with the movable circular members.

Specifically, the invention is designed to provide an improved calculating device adapted to determine unit cost price of merchandise or to ascertain the desired unit selling price including appropriate allowances for service charges or trade discounts obtainable by addition or subtraction of certain values based on discounted ratios and to include marginal profit allowances so that in a relatively few operations of the device, the unit cost price is readily obtained to which is added a selected service charge or from which is subtracted a trade discount, and thereafter the unit selling price is obtainable by adding proper marginal allowances, the relation of the scales being such that a few simple movements will produce such calculations accurately and rapidly.

Moreover, commodity discounts or free deals and chain discounts may be taken in consideration in making those computations without involving intricate operations or affecting the few simple movements of the device that produce the aforesaid results in rapidly and accurately ascertaining the unit cost price or the unit selling price.

Other objects and advantages will be apparent from the following detail and description, when taken in connection with the accompanying drawing, which forms a part hereof.

Figure 1:
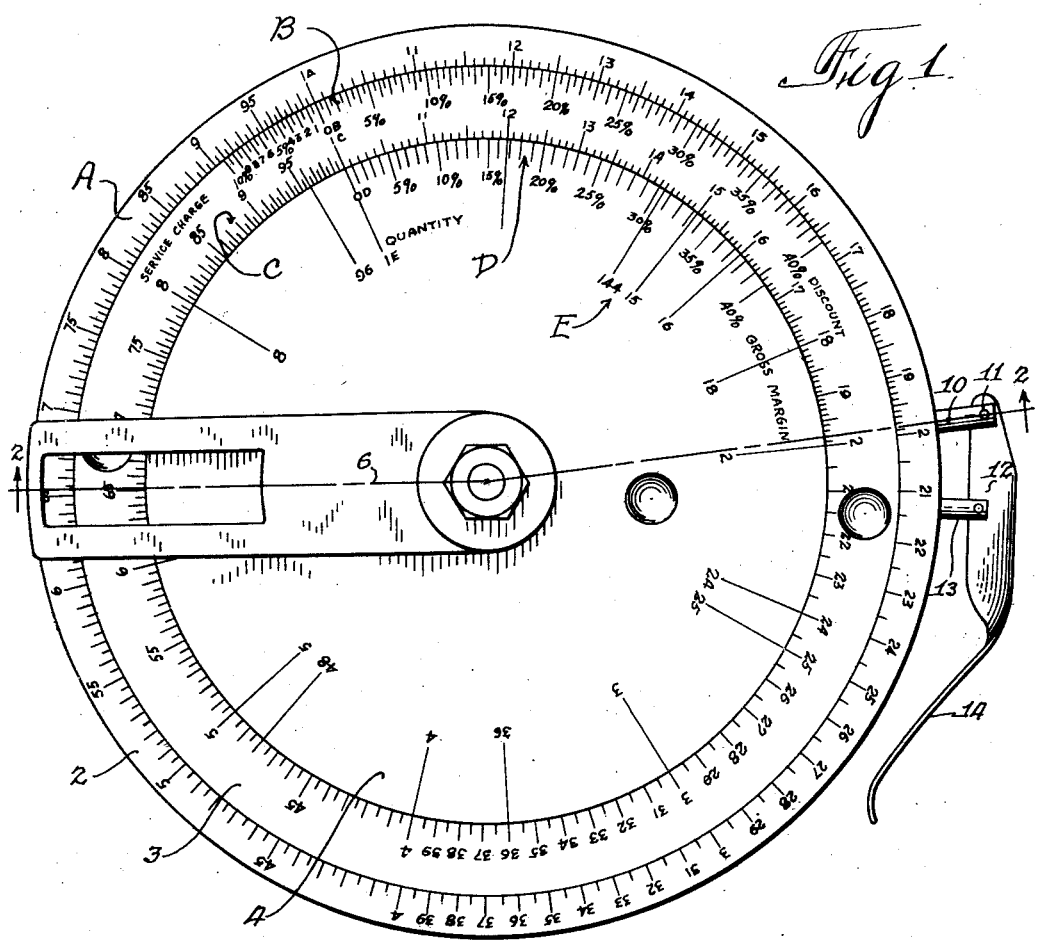
Figure 1 is a top plan view of a device embodying the present invention.
Figure 2:
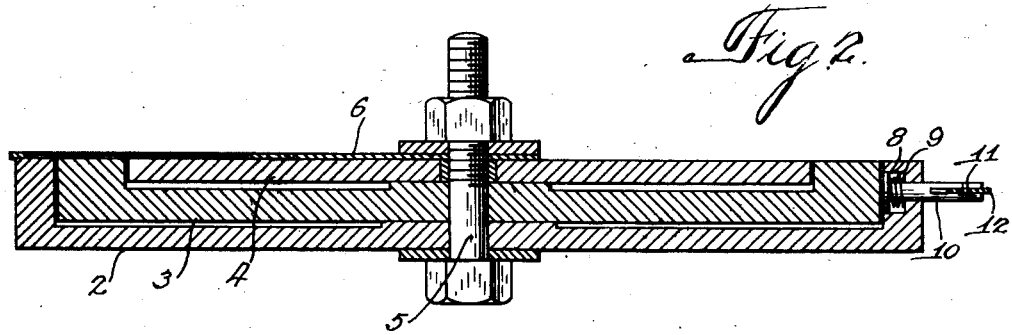
Fig. 2 is a sectional view taken on line 2—2 of Fig. 1.

In the preferred embodiment of the invention, the calculating device comprises a series of concentrically mounted circular members 2, 3 and 4 having a plurality of logarithmic scales thereon, preferably five in number and designated broadly as A, B, C, D and E. The circular members are arranged to rotate about pivot 5 which may comprise a suitable bolt-like element holding the circular members in concentric rotatable relation and securing a pointer 6 in position to be freely movable about the working faces of the circular members 2, 3 and 4.

Logarithmic scale A is delineated along the inner edge of circular member 2, while the inner circular member 3 is provided with logarithmic scale B along its outer edge to cooperate with the markings of scale A. Circular member 3 is also provided with logarithmic scale C along its inner edge. The inner circular member 4 is provided about its edge with logarithmic scales D and E, the starting points of each being coincident but beginning with zero at scale D and with the number one at scale E.

Scales A and C are the logarithms of 1 to 10, inclusive, and are the same except the radius of scale C is smaller. Scale B is provided for the purpose of setting scale C with respect to scale A. The starting point of scale B represents the factor one but is marked as zero, being aligned with point one on scale C with respect to the center. Scale B is an intermediate scale of different logarithmic values between scales A and C, one of these sets of values being limited to the logarithm of 101 to 110 spaced off in counterclockwise direction and the other limited to divisions beginning at zero and running to 40, each such division being a logarithm of 100 minus the designation in inverse order and laid off in counterclockwise direction. The division of five per cent is located by the logarithm of 95. The division of ten per cent is located by the logarithm of 90, etc. The purpose of scale B is to permit placing of scale C with respect to scale A so that any desired relation can be secured between a point on scale B and a point on scale A by extending a line passing from the center of the device through the point on scale C, this being obtained by the use of pointer 6. The different logarithmic values of scale B are representative of a service charge and a trade discount within ranges customarily recognized as adequate in computing unit price cost of the general run of merchandise. The effect of the relation obtainable between scales A and C by the use of scale B is that when the number one (starting point) of scale A is opposite any of the figures marked discount on scale B, any point on scale A has the value of the point on scale C lying on the same radius, with a deduction for the discount shown. This is accomplished by multiplication of the pont on scale C by one hundred per cent minus the discount shown. When the starting point one of scale A is opposite any designation marked service charge on scale B, any point on scale A has the value of the corresponding point on scale C multiplied by one hundred per cent plus the service charge shown. Accordingly, when the starting point one on scale A is opposite the point marked zero on scale B (meeting point of service charge and discount) any point on scale A has the same value as the corresponding point on scale C.

As previously stated, the inner circular member 4 bears two scales D and E. The starting points of these scales coincide and begin with zero for scale D and with one for scale E. Scale D is a logarithmic scale for multiplying the values of scale C and scale A in such a manner that the results obtained exceed the original values by the marked percentages of the resulting values. This is accomplished by marking off a logarithmic scale in a counterclockwise direction starting at the initial point marked zero. Scale D runs from zero per cent to forty per cent. The location of the point marked forty per cent is the logarithm of 6, and hence, the value on scale C opposite the initial point on scale D is .6 of the value of the point on scale C opposite the point marked forty per cent on scale D. Hence, the difference in the value between the designation on scale C opposite the point marked zero and the value on scale C opposite forty per cent is forty per cent of the value which is opposite the point marked forty per cent. The relationship at all other points shown is correspondingly the same.

Scale E is also a logarithmic scale of the same values as scales A and C and is marked off in clockwise direction, differing by the fact that the actual marked designations are provided for selected numbers rather than for all numbers. Pointer 6 is here employed to make the read'ngs more convenient and to permit the ready transfer of operations from scales D and B to scale A.

The operation of the device will now be described where discounts and service charges are eliminated from the calculations. To ascertain the unit cost, the discounted unit selling price and the margin of profit to be applied or the margin of profit to be obtained at the selling price selected, the designation on scale E representing the quantity at which the articles are priced wholesale is set opposite the point on scale C representing the wholesale price. For example, if a case of two dozen articles or packages is priced at $1.86, designation 24 on scale E is set opposite designation 186 on scale C. The unit cost will then be read as 7.75 cents on scale C opposite designation marked one on scale E. To ascertain the selling price with the desired margin of profit added after the unit cost is thus obtained, pointer 6 will be moved to the mark on scale D representing this desired margin of profit. For the example given, the selling price will be 10.33 cents based upon a twenty-five per cent margin of profit. Should the calculated selling price result in a fraction unsuitable for use, a whole figure may be adopted. The margin of profit actually obtained by the use of the whole figure may then be determined by moving the pointer to the designation on scale C representing the whole figure selected and the margin percentage read upon scale D. To illustrate, if the seller desires to price the articles at 10½ cents (2 for 21 cents), he will find upon moving pointer 6 to 105 on scale C that the resulting gross margin is approximately 26.2 per cent.

When discounts or service charges are employed in the computation, the intermediate circular member 3 is moved until the appropriate figure on scale C, representing the discount or service charge to be used, is opposite the starting point of scale A. The marking on scale E representing the quantity of goods by which the goods are priced is then set opposite the point on scale C representing the list or nominal price for this quantity. Pointer 6 is then moved to point one of scale E and the actual cost price per unit is read upon scale A. Without disturbing this setting of the parts, the pointer 6 is then moved to the marking on scale D representing the desired gross margin. The corresponding sale price is then read on scale A.

As for commodity discounts or free deals, which may be defined as the inclusion of a certain amount of merchandise without charge in consideration of the purchase of a given quantity of either the same or different merchandise, the same procedure above described may be employed in the operation of the device to compute the unit cost price and the unit selling price of the articles. Where the free articles included in the deal are the same in every respect as those of the quantity purchased, pointer 6 is moved to the designation on scale A representing the total quantity for which the charge is made and thereafter the pointer 6 is held stationary while scale C is moved until the designation on scale C representing the quantity received is brought beneath the pointer. For example, if ten articles are given gratis with a purchase of 96 units, pointer 6 is set at 96 on scale A and is then held stationary while scale C is rotated until designation 106 on scale C is brought beneath the pointer. At this point, the cash discount corresponding to the free deal may be read directly on scale B by moving the pointer only to marking one on scale A, keeping all other parts stationary. Irrespective of this latter operation, the mark on scale E representing the quantity by which the articles are priced wholesale in quantity lots is set opposite the wholesale price for the quantity on scale C and the net cost per unit may be then ascertained on scale A opposite the line marked zero on scale D. From this point, the selling price per unit may be quickly ascertained by following the procedure above described in connection with the computation of margin of profit. Pointer 6 will be moved to the marking on scale D representing the desired margin of profit and the selling price will be noted at the opposing mark on scale A.

If the commodity discount is in the nature of a free deal involving a gratuity of articles of a different character, either as to size of package, price or nature of material, unit price cost will then be computed upon the basis of relative values. The number of free articles and their values will be taken into consideration in connection with the quantity purchased and the price charged therefor. This may be accomplished by adding quantities and prices together in a manner to account for the difference in value and number between the purchased units and the free articles.

As will be apparent, the device also novelly lends itself to transactions involving chain discounts wherein the initial discount is given on a nominal price, a second discount is given on the reduced price, and possibly other additional discounts are given, each on the price reduced by all previous discount operations. Normally, these computing operations become rather complicated when unit cost price and unit selling price plus a given gross margin are quickly desired. However, the device disclosed may be uniquely used for this purpose and will not require any added structure, this being due to the manner in which the scales are provided to permit the various computations described herein.

Scale B is first set to bring the percentage marking thereon representing the first discount opposite the starting point of scale A. Pointer 6 is then moved to align with the mark of zero on scale B. The pointer remains in this position but scale B is again moved until the marking thereon representing the second discount figures comes into alignment with pointer 6. Pointer 6 is then moved to a new location of marking zero on scale B. This operation is continued until each discount of the chain is included. The total or combined discount is then shown opposite point one on scale A. The computation of unit cost and desired selling price, in a manner previously described, then proceeds but by keeping scales A and B unmoved during the operations. For example, if a transaction involved a chain discount of 20%, 10% and 5%, scale B would be first moved to bring the marking representing 20% opposite point one on scale A. Pointer 6 would then be moved to the marking of zero on scale B and allowed to remain in its position until scale B is again moved to bring the marking representing 10% in alignment with the pointer. The pointer 6 is again moved to the marking of zero on scale B and allowed to remain in this position until the marking representing 5% on scale B is moved to align with the pointer 6. Scale B would then show a reading of 31.5% on scale B opposite mark one on scale A as the equivalent discount to this chain discount. From this point, the computation for unit cost and the desired selling price will proceed in the manner previously described.

Inasmuch as scale B determines the relation between scales A and C, it is quite desirable to keep outer circular member 2 locked to intermediate circular member 3 while inner circular member 4 is rotated to relate scales D or E to scale C. This may be accomplished in different ways, but in the drawing the device is shown with a brake mechanism comprising an arcuate brake shoe 8 normally held pressed against the outer periphery of intermediate circular member 3 by a spring 9. Shoe 8 is carried upon a rod 10, about which spring 9 is mounted. Rod 10 is pivoted at 11 to a lever 12. Lever 12 is pivotally mounted upon a fixed pin 13 projecting from the side of outer member 2. Lever 12 terminates in a conveniently shaped handle 14 against which the hand of the operator may press while holding the device so that shoe 8 can be quickly released when desired to permit relative rotation between the two members 2 and 3. Other forms of locking mechanism may be provided.

From the foregoing description, it will be obvious that the structure has utility and affords a simple means of computing unit cost prices and unit selling prices and that the arrangement of its parts is such that its use is exceptionally flexible to include in these computations practically all factors that must be taken into consideration in arriving at these prices accurately. It will also be obvious that the structure provided is capable of caring for other conditions than those mentioned. The arrangement of the scales and their relation to each other to permit the numerous calculations herein mentioned are considered to be novel and new.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A calculating device for determining a unit cost price comprising an outer circular member, an intermediate circular member and an inner circular member, said members being concentrically arranged and movable with respect to each other, three logarithmic scales of the same values but of different radii extending about said members in clockwise direction, there being one of said scales on each member, and a fourth scale on said intermediate member registering with said logarithmic scale on said outer member, said fourth scale having one portion of its divisions represented in values of logarithms of 100 minus the respective designations in inverse order and laid off in counterclockwise direction to a given point and the other portion of its divisions beginning at another point and represented in true values beginning with the logarithm of 101.

2. A calculating device for determining unit cost and unit selling prices comprising an outer circular member, an intermediate circular member and an inner circular member, said members being concentrically arranged and movable with respect to each other, three logarithmic scales of the same values but of different radii extending about said members in clockwise direction, there being one of said scales on each member, a fourth scale on said intermediate member registering with said logarithmic scale on said outer member, said fourth scale having one portion of its divisions represented in values of logarithms of 100 minus the respective designations in inverse order and laid off in counterclockwise direction to a given point and the other portion of its divisions beginning at another point and represented in true values beginning with the logarithm of 101, and a fifth scale on said inner member, said fifth scale having its divisions represented in values of logarithms of 100 minus the designations in inverse order and also laid off in counterclockwise direction.

ALEXANDER C. FINDLAY.